United States Patent [19]  [11] 3,922,599
Steingroever et al.  [45] Nov. 25, 1975

[54] A.C. ELECTROMAGNETIC THICKNESS GAUGE UTILIZING PREMAGNETIZATION OF THE GAUGE CORE TO RENDER SENSITIVITY INDEPENDENT OF THICKNESS

[75] Inventors: Erich Steingroever, Bonn; Hans F. Nix, Cologne, both of Germany

[73] Assignee: Elektro-Physik, Hans Nix & Dr. -Ing. E. Steingroever KG., Cologne, Germany

[22] Filed: Aug. 28, 1974

[21] Appl. No.: 501,354

[30] Foreign Application Priority Data
Sept. 12, 1973  Germany............................ 2345848

[52] U.S. Cl.............................................. 324/34 TK
[51] Int. Cl.²........................................ G01R 33/12
[58] Field of Search................... 324/34 TK, 40

[56] References Cited
UNITED STATES PATENTS
3,405,353  10/1968  Smith et al. .................... 324/34 TK
3,761,804  9/1973  Steingrover.................... 324/34 TK FOREIGN PATENTS OR APPLICATIONS
45,373   2/1962  Poland............................ 324/34 TK
1,144,538  3/1969  United Kingdom ............ 324/34 TK

*Primary Examiner*—Robert J. Corcoran

[57] ABSTRACT

The sensitivity of an electromagnetic thickness gauge of the type which employs a pole piece to contact the surface being measured, can be altered to provide more accurate readings of very thin coatings by premagnetizing the core. Premagnetization can be accomplished by using a permanent magnet, or an energized coil.

26 Claims, 7 Drawing Figures

A.C. ELECTROMAGNETIC THICKNESS GAUGE UTILIZING PREMAGNETIZATION OF THE GAUGE CORE TO RENDER SENSITIVITY INDEPENDENT OF THICKNESS

The present invention relates to an electromagnetic gauge for measuring the thickness of a layer of material applied to a base wherein the gauge comprises essentially a soft magnetic core having a pole piece which is placed in contact with the surface of the layer to be measured while the core is energized by an alternating current.

The prior gauges of this type include an elongated core of soft magnetic material one end of which has a convex surface which serves as the pole piece for contact with the layer to be measured. The elongated core is surrounded by an energizing coil which is connected to a source of alternating current whereby an alternating magnetic field is developed in the core. The core is also provided with a measuring coil disposed between the pole piece end and the energizing coil or, alternatively, there may be a pair of measuring coils disposed on opposite sides of the energizing coils. In either case, an electrical value, such as voltage, is thereby induced in the measuring coil, or coils, when the core is subjected to a magnetic field produced by the energizing coil.

The voltage induced in a measuring coil will vary as the pole piece approaches, or recedes from, either a magnetic material or an electrically conductive material. In the case of a magnetic material, the magnetic flux in the pole piece will increase as it approaches because of the increase of magnetic conductivity in the magnetic path, whereas the flux decreases in the pole piece as it approaches an electrically conductive material because of eddy currents generated therein. When two measuring coils are employed, they are usually connected together in opposition to each other so that the difference in the voltages induced in them is used for measurements. This voltage is a function of the distance between the convex face of the pole piece and a body of magnetic, or electrically conductive, material and therefore, when such a body serves as a base for an applied layer of a dissimilar material, that induced voltage provides a measurement of the thickness of the applied layer when the pole piece is brought into contact with the exterior surface of the layer.

However, a disadvantage of these previously known gauges is the fact that the sensitivity of the gauges varies greatly over the range of thicknesses capable of being measured, that is to say that when the measured layer is very thin, a small change in thickness produces a large change in the measuring voltage while in the case of a thick layer of applied material a large change in thickness produces only a comparably small change in voltage. In other words, a curve representing the relationship between thickness and induced voltage in the prior art gauges is non-linear and the slope of the curve is greatest at the low end of the scale and flattens out towards the horizontal as the thickness increases.

It is therefore an object of the present invention to improve the sensitivity of electromagnetic thickness gauges of the single pole type when measuring thin layers.

It is also an object of the invention to provide thickness gauges of the aforementioned type in which the sensitivity of the gauge can be adjusted to suit the characteristics of the materials being measured.

It is a further object of the invention to provide an electromagnetic thickness gauge of the type wherein the thickness measured is represented by an electrical value displayed on the scale of a measuring instrument and wherein the electrical values actually produced by a particular gauge can be adjusted to coincide with the values displayed by a previously prepared scale.

The improvement consists in the provision of means whereby the soft magnetic core is pre-magnetized in such a way that the sensitivity of the instrument can be made generally independent of the thickness of the layer being measured, particularly in the case of thin layers. Pre-magnetization can be achieved either by the insertion of a permanent magnet, or an electrically energized coil, in the magnetic field of the measuring instrument core and the amount of pre-magnetization can be varied by either the substitution of permanent magnets of various magnetic values or changing their magnetization or changing the position of the magnet with respect to the core and; in the case of a pre-magnetizing coil, by varying the current supplied to it. A further improvement consists in connecting the measuring coil in the circuit of a high frequency oscillator circuit so that a single coil can be utilized to develop the energizing magnetic field and to measure changes in induced electrical values.

Other objects and advantages will be apparent to those skilled in the art after reading the following specification in connection with the annexed drawings, in which.

Figure 1:
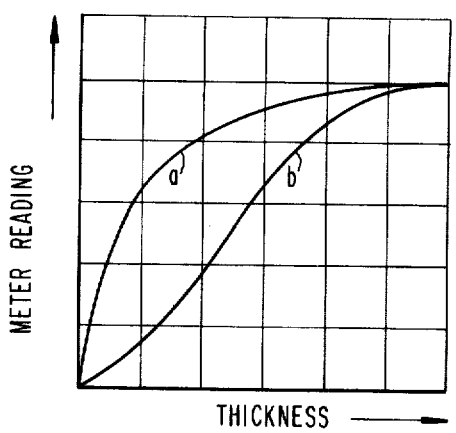
FIG. 1 is a graph representing typical relationships between the meter readings of a thickness measuring gauge plotted against the thickness being measured in the case of prior art devices as compared to the present invention.

In the drawings, the curve identified by the letter $a$ in the graph of FIG. 1, represents typical meter readings of a measuring gauge of the prior art, plotted vertically, corresponding to thicknesses of measured layers, plotted horizontally. It will be seen that at the low end of curve $a$, it rises very rapidly and gradually flattens out at the upper end. The reason for this is that the permeability of the soft magnet core permits a disproportionate response to the presence of a magnetic material, or an electrically conductive material, when it is close to such a material which is the situation when the measured layer is a thin coating thereon. Similarly, the core is disproportionately responsive to changes in the thickness of a very thin layer of a magnetic field influencing material when such a material comprises the measured layer because a small change in thickness of a very thin layer is proportionately greater in relation to the thickness before the change took place than is the case when the same change occurs in a very thick layer.

However, it has been found that by pre-magnetizing the core so as to provide an initial magnetic field in addition to that produced by the energizing coil, it is possible to nullify to a certain extent, the disproportionate effects produced when the pole piece is close to a magnetic field inducing material, or in contact with a thin layer of such materials, with the result that the curve of the instrument readings can be altered to a form typically represented in curve b.

In addition to the fact that the flatter slope of the curve at the low end reduces excessive sensitivity to the measurement of thin layers it is also possible, by adjusting the amount and character of pre-magnetization, to "tailor" the characteristics of a series of mass-produced cores so that variations in individual pieces can be compensated for in such a way that the electrical values produced will correspond to the scale values, or other measurement parameters, of a series of mass-produced indicating instruments, and avoid the necessity for providing a calibration chart or an individual scale for each instrument.

Figure 2:
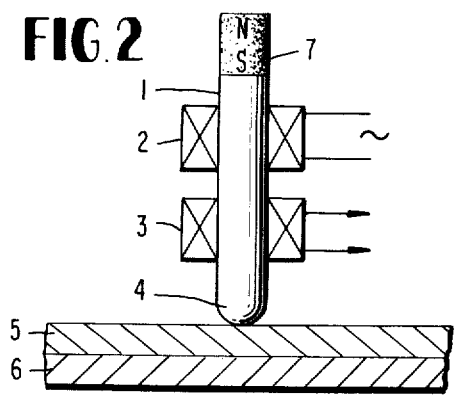
FIG. 2 is a preferred form of electromagnetic gauge constructed in accordance with the teachings of this invention.

A preferred form of apparatus for carrying out the invention is shown in FIG. 2 in which an elongated core 1 is surrounded by an energizer coil 2 which can be connected to a source of alternating current (not shown). A measuring coil 3 also surrounds the core and is provided with leads for connection with a measuring instrument, such as a voltmeter (not shown), which can have a scale which reads directly in units of thickness. The lower end of the core is preferably formed with a convex surface to define a pole piece 4 which is placed in contact with the exposed surface of a layer 5 (the surface to be measured) which is applied to a base 6.

In this case, pre-magnetization of the core is accomplished by positioning a permanent magnet 7 at the end of the core opposite to the pole piece 4, and it can be fixed in contact with, or spaced away from, the end of the core. The magnet is oriented so that its N–S axis lies parallel with the magnetic axis of the core and the adjustment of the additional magnetic field provided by the permanent magnet is accomplished by regulating its magnetic flux.

Preferably, the core and magnet are assembled with the magnet fully magnetized, after which the magnet is demagnetized to the extent necessary to obtain the desired reading on the scale of the indicating instrument. This demagnetization, or weakening, can be done after assembly by subjecting the magnet to an axially adjustable alternating magnetic field, the amplitude of which is first increased and then decreased.

Figure 3:
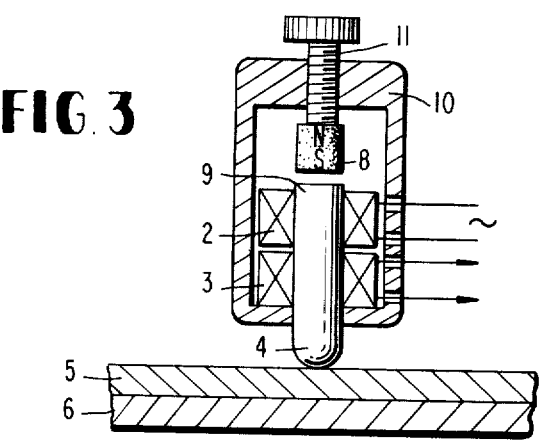
FIG. 3 is a modified form of the gauge of FIG. 2 in which the permanent magnet is adjustable.

Another form of the invention in which the strength of the permanent magnet remains fixed is shown in FIG. 3, in which the spacing between the magnet 8 and the end of the core 9 is accomplished by mounting the magnet on the end of a screw 11 which is threaded into an opening in a housing 10 which also supports the core 9. Rotation of the screw 11 causes the spacing between the magnet and core to be varied to vary the amount of pre-magnetization.

Figure 4:
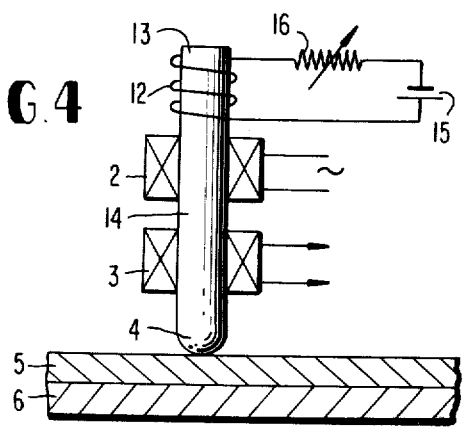
FIG. 4 is still another form of the invention in which an energized coil is schematically shown for pre-magnetization of the core.

In the modification shown in FIG. 4, pre-magnetization is accomplished by means of a coil energized to generate a magnetic field. In this case, a coil 12 is wound on the end 13 of an elongated core 14, which is opposite to the pole piece 4. The coil is energized by a source of direct current, such as a battery 15, which is connected with the coil in circuit with a control such as the variable resistance 16. A uni-directional magnetic field is produced by the coil 12; which performs the same function as the permanent magnets previously described, and the strength of the field can be adjusted by resistance 16.

Figure 5:
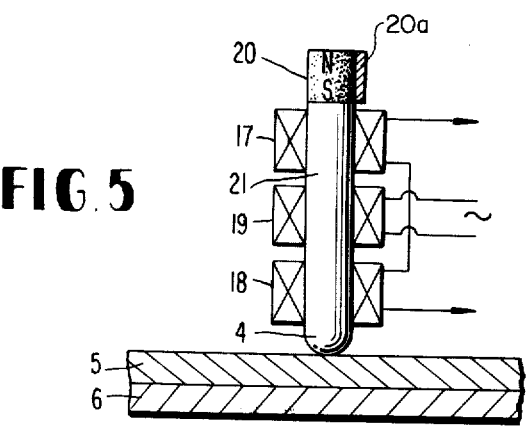
FIGS. 5 and 6 illustrate further modified forms of the invention.

In the form of the invention shown in FIG. 5, the elongated core 21 is provided with two similar measuring coils 17 and 18, which are positioned on opposite sides of the energizing coil 19. In this case, the coils 17 and 18 are connected in opposition to each other and the difference in their respective induced voltages is supplied to the measuring instrument. Pre-magnetization can be supplied by means of a permanent magnet 20 and the influence of this magnet can be varied, either by adjusting its magnetization, as in FIG. 2, or by adjusting the spacing from the core, as in FIG. 3.

Figure 6:
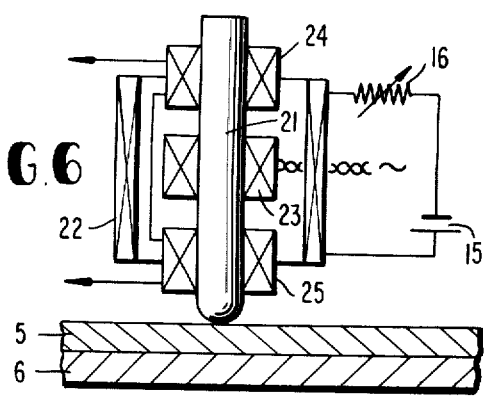

Another arrangement for adjustably pre-magnetizing the core of the apparatus of FIG. 5, is shown in FIG. 6, wherein the core 21 is provided with an energizing coil 23 and two oppositely connected measuring coils 24 and 25. These coils, in turn, are surrounded by a coil 22 which is connected to a battery, or other direct current source, 15 through the variable resistance 16 for regulating the strength of the magnetic field generated by coil 22.

Figure 7:
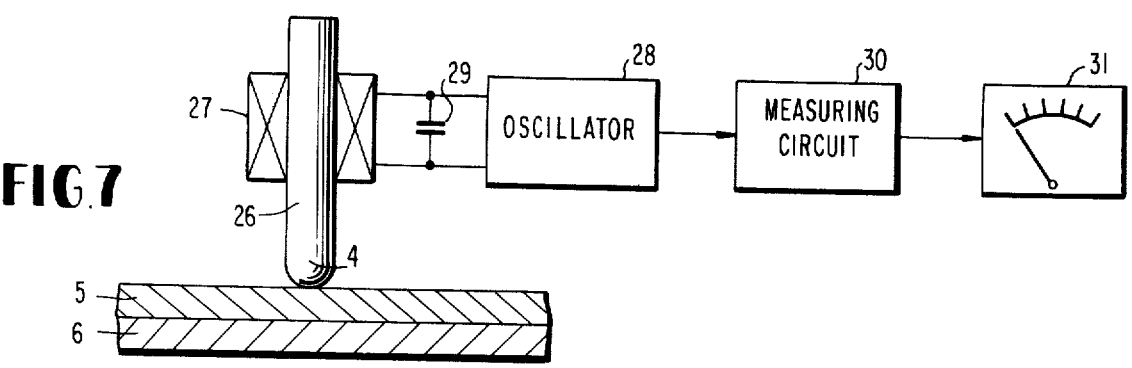
FIG. 7 is a schematic diagram of a modification of the invention in which a single coil is employed for energization of the magnetic field and also for measuring the resultant effect of the measured layer.

Still another form of the invention is shown in FIG. 7 in which a single coil can be utilized to energize the magnetic field as well as to supply electrical values corresponding to measurements of thickness. In this form, the core 26 is provided with a single coil 27, which is connected in a circuit with a high frequency oscillator 28, which may include a capacitor 29. Pre-magnetization of the core can be accomplished by any of the systems previously described.

Because of the fact that the presence of a magnetic or electrically conductive, material in the vicinity of the pole piece will affect the magnetic field surrounding the core a corresponding change in the electric values as inductance, Q-factor, amplitude or frequency of oscillator 28 will also take place. Since these changes of electric values alter also other electrical values, such as voltage or current, in various parts of the circuits, any one of these values can be monitored by circuits which are well known in the art, and indicated by numeral 30, to operate an indicator means 31.

The altering of the curve corresponding to the measured thickness, such as the curves a and b of FIG. 1 in accordance with this invention is conditioned by the variations in the magnetic permeability of the material of which the core is composed. The amount of variation is greater in the case where the saturation magnetization of the core material is smaller than in the case where the material has a high saturation magnetization.

Therefore the core should consist of a soft magnetic material having a saturation magnetization preferably less than 1.4 Tesla. It will also be advantageous if the coercive field intensity of the material is less than 3.0 amperes/cm, preferably less than 1.0 amperes/cm, in order to maintain stable operation of a gauge which includes the premagnetization systems disclosed herein.

An alloy which is particularly suitable for the core is an alloy of iron containing between 13% and 18% of aluminum. The alloy of iron and 16% aluminum has, for example, a saturation magnetization of 0.5 to 1.0 Tesla and a coercive field intensity of less than 1.0 amperes/cm. Alternatively, a satisfactory material can also be obtained if, in the above mentioned alloy, up to 8% of the aluminum is replaced by silicon.

The material used for making a permanent magnet used for pre-magnetizing according to this invention should have a high coercive field intensity of at least 400 amperes/cm and preferably more than 1000 amperes/cm. Such materials can consist of an alloy of iron with aluminum, nickel and cobalt with well known additives of ferrite of the type $BaO.6Fe_2O_3$, or of a material such as $Sm\ Co_5$.

In order to compensate for temperature changes, which would affect the instrument readings, the permanent magnet may be provided with a magnetic shunt, as indicated by numeral 20a in FIG. 5, having a negative temperature coefficient of permeability. A material suitable for this purpose can consist of an alloy of approximately 31% Ni and 69% Fe, which has a decreasing magnetic permeability with increasing temperature.

We claim:

1. In electromagnetic thickness gauges for measuring the thickness of a layer applied to a base wherein the applied layer and the base are composed of two dissimilar materials one of sid two materials having a composition which influences a magnetic field, such as ferromagnetic and electrically conductive materials, and the gauge includes a core of soft magnetic material having a single pole piece for contact with the exposed surface of the layer to be measured and being provided with means for inducing electrical values in a measuring coil associated with said core by subjecting the core to an alternating magnetic field, the electrical values induced in the measuring coil being a function of the strength of the magnetic field and the thickness of the layer being measured, the improvement which comprises means for adjustably pre-magnetizing said soft magnetic core by subjecting the core to an additional uni-directional magnetic field to alter the sensitivity of the gauge to predetermined values of thickness to be measured.

2. The invention defined in claim 1, wherein said means for adjustably pre-magnetizing comprises a permanent magnet mounted in the vicinity of said soft magnetic core.

3. The invention defined in claim 2, wherein said permanent magnet pre-magnetizing means is mounted for movement relative to said core.

4. The invention defined in claim 1, wherein said means for adjustably pre-magnetizing comprises a coil mounted in the magnetic field of said core and means for energizing said last mentioned coil.

5. The invention defined in claim 1, wherein said pre-magnetizing means is adjusted to decrease the sensitivity of said gauge to a thin layer of material being measured as compared to the sensitivity of the gauge without said pre-magnetizing means.

6. The invention defined in claim 5, wherein said pole piece comprises one end of an elongated core and said pre-magnetizing means comprises a permanent magnet mounted in the magnetic field at the other end of said core.

7. The invention defined in claim 6, wherein the axis of magnetic orientation of said permanent magnet is disposed in the direction of the axis of said core.

8. The invention defined in claim 7, wherein said permanent magnet is disposed in contact with said core.

9. The invention defined in claim 7, wherein said permanent magnet is movably mounted in spaced relation to the other end of said core.

10. The invention defined in claim 4, wherein said pole piece comprises one end of an elongated core and said coil for pre-magnetizing said core is disposed at the other end of said core.

11. The invention defined in claim 4, wherein at least a portion of said core is elongated, said measuring coil encircling said elongated portion and said pre-magnetizing coil surrounding said last mentioned coil.

12. The invention defined in claim 1, wherein the saturated magnetization of said soft magnetic material has a value of less than 1.4 Tesla.

13. The invention defined in claim 1, wherein the coercive field intensity of said soft magnetic material is less than 3.0 amperes/cm.

14. The invention defined in claim 1, wherein said soft magnetic material comprises an alloy of iron and between 13% and 18% of aluminum.

15. The invention defined in claim 14, wherein said alloy comprises approximately 16% of aluminum, the saturation magnetization having a value of between 0.5 and 1.0 Tesla and the coercive field intensity having a value less than 1.0 ampere/cm.

16. The invention defined in claim 1, wherein said means for pre-magnetizing said core comprises a permanent magnet having a coercive field intensity of more than 400 amperes/cm mounted in the magnetic field of said core.

17. The invention defined in claim 16, wherein the coercive field intensity of said permanent magnet is more than 1000 amperes/cm.

18. The invention defined in claim 1, wherein said means for pre-magnetizing said core comprises a permanent magnet mounted in the magnetic field of said core, said permanent magnet including a temperature compensating shunt.

19. The invention defined in claim 1, wherein said means for subjecting said soft magnetic core to an alternating magnetic field comprises high frequency oscillator circuit means, said measuring coil being connected in said circuit means.

20. The invention defined in claim 1, wherein said two dissimilar materials comprise a non-magnetic layer to be measured applied to a ferromagnetic base.

21. The invention defined in claim 20, wherein said layer to be measured comprises electrically conductive material.

22. The invention defined in claim 20, wherein said layer to be measured comprises electrically insulating material.

23. The invention defined in claim 1, wherein said two dissimilar materials comprise a non-magnetic electrically insulating material to be measured applied to a non-magnetic base.

24. The invention defined in claim 1, wherein said two dissimilar materials comprise a non-magnetic electrically conductive material to be measured applied to a non-magnetic base.

25. The invention defined in claim 1, wherein said soft magnetic material comprises an alloy of iron, aluminum and silicon, the total amount of aluminum and silicon varying between 13% and 18%, the silicon not exceeding 8% of the aluminum content.

26. The invention defined in claim 1, wherein said soft magnetic material comprises an alloy of iron, aluminum and silicon, the total amount of aluminum and silicon being approximately 16%, the silicon not exceeding 8% of the aluminum content, the saturation magnetization having a value of between 0.5 and 1.0 Tesla and the coercive field intensity having a value less than 1.0 ampere/cm.

* * * * *